United States Patent [19]

Hannestad

[11] 3,997,445
[45] Dec. 14, 1976

[54] APPARATUS FOR LIQUID-LIQUID COUNTERCURRENT EXTRACTION

[75] Inventor: Gunnar Hannestad, Skedsmokorset, Norway

[73] Assignee: Forskningsgruppe For Sjeldne, Jordarter, Oslo, Norway

[22] Filed: July 3, 1975

[21] Appl. No.: 592,901

[30] Foreign Application Priority Data

July 3, 1974 Norway ............................. 742415

[52] U.S. Cl. ...................... 210/319; 23/267 MS; 23/270.5 R; 210/23 R; 210/320
[51] Int. Cl.² ..................... B01F 7/00; B01D 11/04
[58] Field of Search ............... 23/270.5 R, 267 MS; 210/21, 23 R, 319, 320, DIG. 5, 537, 540

[56] References Cited

UNITED STATES PATENTS

| | | |
|---|---|---|
| 2,342,950 | 2/1944 | Lovelady et al. ............. 210/537 X |
| 2,646,346 | 7/1953 | Coplan et al. ............... 23/270.5 R |
| 3,206,288 | 9/1965 | Hazen et al. ................. 23/270.5 R |
| 3,227,649 | 1/1966 | Ghormley et al. .................. 210/21 |
| 3,231,091 | 1/1966 | Kingsbury et al. ........... 210/DIG. 5 |
| 3,233,876 | 2/1966 | Faure et al. ................. 23/270.5 X |
| 3,362,791 | 1/1968 | Ryon ............................. 23/267 MS |
| 3,544,079 | 12/1970 | Dressler ....................... 23/267 MS |

*Primary Examiner*—Charles N. Hart
*Assistant Examiner*—Robert H. Spitzer
*Attorney, Agent, or Firm*—Eyre, Mann, Lucas & Just

[57] ABSTRACT

An apparatus for countercurrent extraction of a dissolved material from a first liquid phase to a second liquid phase is disclosed. The apparatus comprises overflow provision for each of the liquid phases with preferably adjustable overflow for the lower liquid phase whereby desired control of interface level can be obtained.

10 Claims, 2 Drawing Figures

APPARATUS FOR LIQUID-LIQUID COUNTERCURRENT EXTRACTION

The present invention relates to an apparatus for countercurrent extraction of a dissolved material from a first liquid phase to a second liquid phase according to the so-called "mixer-settler" principle. Preferably, a plurality of stages of the apparatus of the present invention are employed as a single unit.

Liquid-liquid separation techniques for the removal of a material dissolved in one liquid to a second liquid are well known in the art. These techniques are especially applicable in selective solvent extraction procedures wherein a plurality of materials are dissolved in a liquid and it is desired to remove but one of the dissolved materials from the liquid. For this purpose is used a second liquid in which only the material to be removed is soluble. The liquids are mixed together and then allowed to separate. Because of the preferential solubility of the selected dissolved material in the second liquid, the selected material will dissolve in this phase according to the preference ratio it has between the two liquids. Of course, some of the other materials dissolved in the first liquid will usually have some affinity for the second liquid. Therefore, to obtain the greatest yield of dissolved material and to obtain the purest yield thereof, there are usually employed a number of sequential extraction steps. These are normally conducted in countercurrent manner and the present invention relates to an apparatus suitable for such extraction techniques.

One of the principal problems which has been encountered with known apparatuses for liquid-liquid extraction is that removal of the separated liquids after mixing and settling thereof is difficult to achieve in a precise manner because of the relatively narrow outlet tubes for each of the liquids. The apparatus of the present invention successfully overcomes this.

These and other features of the present invention may be more fully understood with reference to the drawings wherein.

Figure 1:
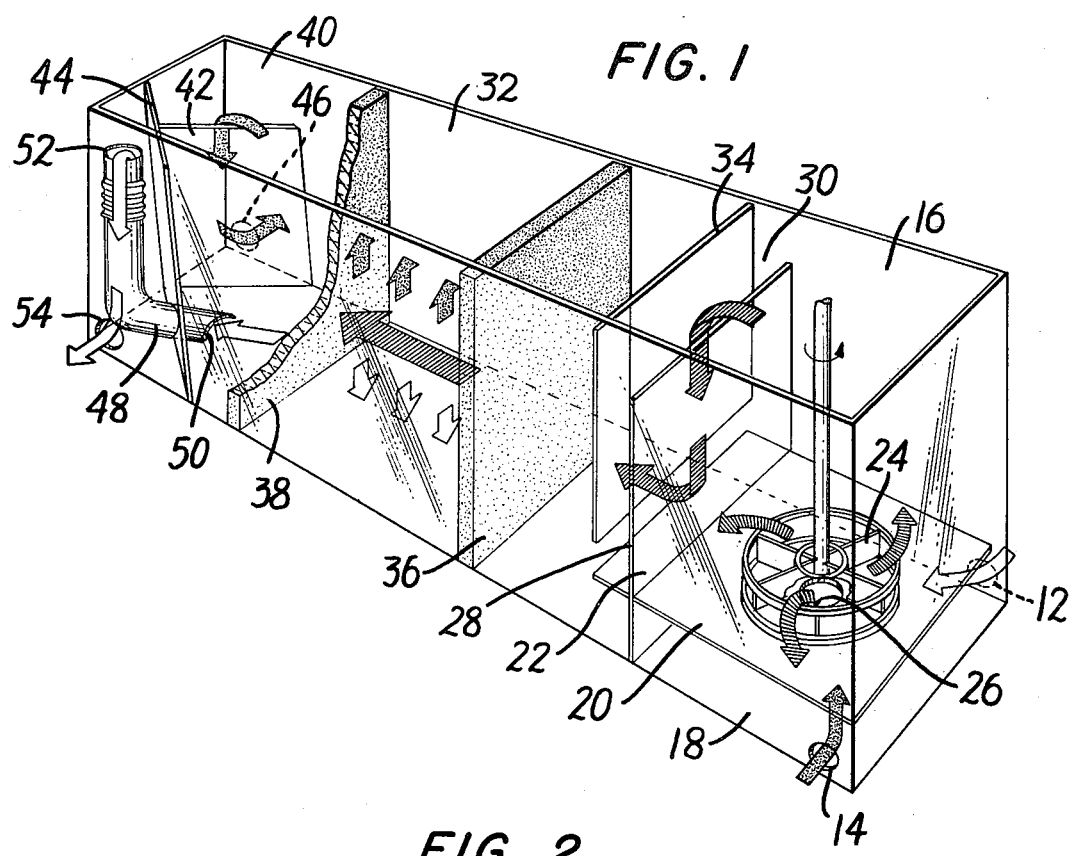
FIG. 1 shows a single apparatus according to the present invention.

Referring to FIG. 1, two immiscible liquids, one of which contains dissolved material and the other of which has preferential affinity for the dissolved material are introduced through ports 12 and 14. It will be appreciated that it makes no difference which of the liquids is the mother liquor and which is the extractant. For purposes of the present description, however, the mother liquor is shown by the black arrow entering port 14 and the extracting liquid is shown by the white arrow entering port 12. The liquids are mixed in chamber 16. This is accomplished by introducing the liquids into a lower chamber 18 having a solid partition 20 between itself and upper chamber 22. Impeller 24 continuously rotating (means not shown) sucks the two liquids through aperture 26 causing their intimate admixture in chamber 16. The intimate admixture is shown by the cross-hatched arrows. As the liquid level rises in chamber 16 it overflows solid partition 28 and falls into adjacent chamber 30. In order to prevent further mixing by introducing turbulence in settling chamber 32, a secondary partition 34 is preferably employed in settling chamber 32 to form the forward portion thereof referenced by 30 down through which the combined liquids pass as indicated by the arrows. Thereafter, the combined liquids pass further into settling chamber 32 and particularly into the intermediate portion having porous cross walls 36 and 38. The porous cross walls permit a relatively free flow of the liquid through the settling chamber while at the same time reducing turbulence therein to enhance the separation of the liquids in the settling chamber 32 as shown by the arrows. After the liquids separate in the intermediate portion of settling chamber 32, they pass through porous wall 38 to the remote end of settling chamber 32 referenced by 40. The settling chamber remote end 40 is provided with partitions 42 and 44 to seal off selected portions of the settling chamber, the height of the wall 44 being above the normal liquid level of the apparatus and the height of wall 42 being just below the liquid level, i.e., wall 44 is higher than wall 42. As the liquid level reaches the top of wall 42, the extractant liquid (the liquid on the top) will flow over the wall and will exit through aperture 46. A tubular member 48 with opening 50 in the lower portion of partition 44 is provided for removal of the mother liquor. In order to adjust the position of the interface of the two liquids, the top 52 of tube 48 is made adjustable in height. It will be appreciated that the top 52 of the tube 48 will slightly be lower than the top of partition 42 for normal operation and that the top 52 of tube 48 may be adjusted to regulate the removal of the mother liquor and extractant liquid and may be further adjusted so that no mother liquor is removed through tube 48 unless extractant liquid is being removed by overflowing partition 42. However, the top 52 of tube 48 is preferably made adjustable upwards or downwards to regulate the interface to the level which is most favorable for the separation of the two liquids. The liquid exiting from the top of 52 passes out exit aperture 54.

Figure 2:
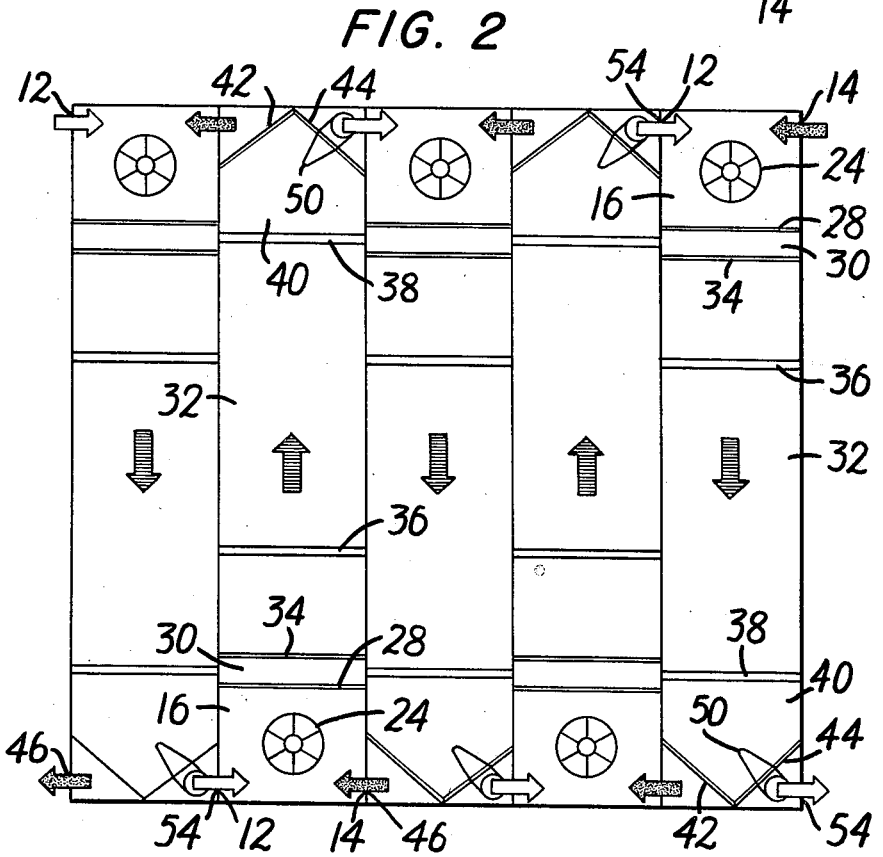
FIG. 2 shows a plurality of the apparatuses of FIG. 1 employed as successive stages in a countercurrent extraction system.

FIG. 2 shows a plurality of the apparatuses of FIG. 1 employed as a unit with the modification that alternative units have portions 42 and 44 and parts 12 and 14 reversed so that the alternate units are individually mirror images of each other. Apertures 46 and 12 of one unit are aligned to correspond to apertures 12 and 46 of an adjacent unit respectively as are apertures 14 and 54. In this way, the mother liquor is continuously passing in one direction and the extractant liquid is continuously passing in countercurrent flow. In FIG. 2, the extracting liquid passes from the upper aperture of the far right unit through each of the units and exits from the lower aperture of the most left unit. In contrast to this, the mother liquid enters in the upper aperture of the most left unit and after passing through each of the units exits through the lower aperture of the far right unit.

Referring again to FIG. 1 and specifically to settling chamber 32 thereof, partitions 42 and 44 are preferably designed so that each forms a triangular chamber in a corner of the settling chamber 32 as shown. Furthermore, the partitions 42 and 44 are preferably inclined with respect to the side walls of the separation chamber. These features have been found to enhance the separation of the two liquids.

It will be understood that the claims are intended to cover all changes and modifications of the preferred embodiment of the invention, herein chosen for the purpose of illustration, which do not constitute departures from the spirit and scope of the invention.

What is claimed is:

1. Apparatus for use in countercurrent extraction of a dissolved material from a first liquid phase to a second liquid phase immiscible with said first liquid phase comprising in sequence:
   a. means for combining and mixing the two liquid phases; and
   b. a settling chamber for permitting separation of the two immiscible liquids comprising
   c. a remote end for separate removal of the two immiscible liquids, said remote end including a first partition sealing off a first portion thereof and a second partition sealing off a second portion thereof separate from the first portion, the first portion and the second portion each having an outlet, the height of the first partition being greater than the height of the second partition, a tube being provided in the remote end having a first end positioned in the remote end outside the first sealed off portion and a second end positioned above the first end within the first sealed off portion and positioned slightly lower than the height of said first partition during normal apparatus operation.

2. The apparatus of claim 1 wherein the partitions are plane walls which are inclined with respect to the walls of the settling chamber.

3. The apparatus of claim 1 wherein the second end of the said tube is adjustable in height.

4. The apparatus of claim 1 wherein the settling chamber has at least one porous wall vertically positioned therein.

5. An apparatus for countercurrent extraction of a dissolved material from a first liquid phase to a second liquid phase immiscible with said first liquid phase wherein a plurality of the apparatuses of claim 1 are employed in adjacent relationship, each said apparatus being in register with the adjacent apparatus to permit flow of at least one of the liquids from one said apparatus to an adjacent said apparatus, each said at least one liquid flowing from the settling chamber of one said apparatus to the mixing chamber of the adjacent said apparatus, adjacent apparatuses individually being mirror images of each other.

6. Apparatus for use in countercurrent extraction of a dissolved material from a first liquid phase to a second liquid phase immiscible with said first liquid phase comprising in sequence:
   a. means for combining and mixing the two liquid phases; and
   b. a settling chamber for permitting separation of the two immiscible liquids comprising
   i. a remote end for separate removal of the two immiscible liquids, said remote end including a first partition sealing off a first portion thereof and a second partition sealing off a second portion thereof separate from the first portion, the first portion and the second portion each having an outlet the height of the first partition being greater than the height of the second partition, a tube being provided in the remote end having a first end positioned in the remote end outside the first sealed off portion and a second end positioned above the first end within the first sealed off portion, said second end being adjustable in height and positioned slightly lower than the height of said first partition during normal apparatus operation; and
   ii. an intermediate portion, said intermediate portion including turbulence reducing means comprising at least one porous cross-wall vertically positioned therein.

7. An apparatus for countercurrent extraction of a dissolved material from a first liquid phase to a second liquid phase immiscible with said first liquid phase wherein a plurality of the apparatuses of claim 6 are employed in adjacent relationship, each said apparatus being in register with the adjacent apparatus to permit flow of at least one of the liquids from one said apparatus to an adjacent said apparatus, each said at least one liquid flowing from the settling chamber of one said apparatus to the mixing chamber of the adjacent said apparatus, adjacent apparatuses individually being mirror images of each other.

8. Apparatus for use in countercurrent extraction of a dissolved material from a first liquid phase to a second liquid phase immiscible with said first liquid phase comprising in sequence:
   a. a mixing chamber for combining and mixing the two liquid phases, said mixing chamber comprising a lower portion and an upper portion and means communicating said upper and lower portions, said lower portion having means for introducing the two liquid phases therein;
   b. a settling chamber communicating with said mixing chamber upper portion for permitting separation of the two liquid phases comprising:
   i. a remote end for separate removal of the two immiscible liquids, said remote end including a first partition sealing off a first portion thereof and a second partition sealing off a second portion thereof separate from the first portion, the first portion and the second portion each having an outlet the height of the first partition being greater than the height of the second partition, a tube being provided in the remote end having a first end positioned in the remote end outside the first sealed off portion and a second end positioned above the first end within the first sealed off portion, said second end being adjustable in height and positioned slightly lower than the height of said first partition during normal apparatus operation; and
   ii. an intermediate portion, said intermediate portion including turbulence reducing means comprising a plurality of porous cross-walls vertically positioned therein and a baffle positioned upstream of said cross-walls.

9. An apparatus for countercurrent extraction of a dissolved material from the first liquid phase to a second liquid phase immiscible with said first liquid phase wherein a plurality of the apparatuses of claim 8 are employed in adjacent relationship, each said apparatus being in register with the adjacent apparatus to permit flow of at least one of the liquids from one said apparatus to an adjacent said apparatus, each said at least one liquid flowing from the settling chamber of one said apparatus to the mixing chamber of the adjacent said apparatus, adjacent apparatuses individually being mirror images of each other.

10. A composite apparatus for countercurrent extraction of a dissolved material from a first liquid phase to a second liquid phase immiscible with said first liquid phase comprising:
   a. at least one first apparatus comprising in sequence:

i. a mixing chamber for combining and mixing the two liquid phases, said mixing chamber comprising a lower portion and an upper portion and means communicating said upper and lower portions, said lower portion having means for introducing the two liquid phases therein; and ii. a settling chamber for permitting separation of the two immiscible liquids comprising:

1. a remote end for separate removal of the two immiscible liquids, said remote end including a first partition sealing off a first portion thereof and a second partition sealing off a second portion thereof separate from the first portion, the first portion and the second portion each having an outlet the height of the first partition being greater than the height of the second partition, a tube being provided in the remote end having a first end positioned in the remote end outside the first sealed off portion and a second end positioned above the first end within the first sealed off portion, said second end being adjustable in height and positioned slightly lower than the height of said first partition during normal apparatus operation; and 2. an intermediate portion, said intermediate portion including turbulence reducing means comprising at least one porous cross-wall vertically positioned therein;

b. at least one second apparatus which is individually the mirror image of said first apparatus; and c. said at least one first and said at least one second apparatuses being positioned in adjacent relationship, each said apparatus being in register with the adjacent apparatus to permit flow of at least one of the liquids from one said apparatus to an adjacent said apparatus, each said at least one liquid flowing from the settling chamber of one said apparatus to the mixing chamber of the adjacent said apparatus.

* * * * *